US006891806B2

(12) United States Patent
Maegawa

(10) Patent No.: US 6,891,806 B2
(45) Date of Patent: May 10, 2005

(54) NETWORK MANAGEMENT METHOD, APPARATUS OF SAME AND NETWORK SYSTEMS

(75) Inventor: Hirotoshi Maegawa, Tokyo (JP)

(73) Assignee: Matsushita Electric Co., Ltd., Osaka (JP)

( * ) Notice: Subject to any disclaimer, the term of this patent is extended or adjusted under 35 U.S.C. 154(b) by 0 days.

(21) Appl. No.: 10/725,892

(22) Filed: Dec. 2, 2003

(65) Prior Publication Data

US 2004/0076123 A1 Apr. 22, 2004

Related U.S. Application Data

(63) Continuation of application No. 09/957,440, filed on Sep. 17, 2001, now Pat. No. 6,683,857, which is a continuation of application No. 08/811,472, filed on Mar. 4, 1997, now Pat. No. 6,335,919.

(30) Foreign Application Priority Data

May 3, 1996 (JP) ............................................ 8-047735

(51) Int. Cl.[7] ............................................ H04L 12/28
(52) U.S. Cl. ...................................... 370/254; 370/400
(58) Field of Search ................................ 370/254, 255, 370/351, 389, 400, 401, 408, 475, 410, 392, 522, 238

(56) References Cited

U.S. PATENT DOCUMENTS

| 5,261,044 A | | 11/1993 | Dev et al. | |
| 5,517,494 A | * | 5/1996 | Green ......................... | 370/408 |
| 5,651,006 A | * | 7/1997 | Fujino et al. ................ | 370/408 |
| 6,335,919 B1 | * | 1/2002 | Maegawa .................... | 370/254 |
| 6,683,857 B2 | * | 1/2004 | Maegawa .................... | 370/254 |

FOREIGN PATENT DOCUMENTS

| EP | 97 10 3666 | 11/1999 |
| JP | 6 318 783 7 | 3/1988 |

OTHER PUBLICATIONS

Valerie Gay et al., "Specification of Multiparty Audio and Video Interaction Based on the Reference Model of Open Distributed Processing", Computer Networks and ISDN Systems, vol. 27, No. 8, Jul. 1, 1995, pp. 1247–1262.

Bernd Kampmann et al., "APPN Architecture and Product Implementation Tutorial", XP–002113524, IBM "Red Book", May 1, 1991, pp. 83–92.

Bernd Kampmann et al., "APPN Architecture and Product Implementation Tutorial", XP–002113525, IBM "Red Book", May 1, 1991, pp. 1–22.

Bernd Kampmann et al., "APPN Architecture and Product Implementation Tutorial", XP–002113526, IBM "Red Book", May 1, 1991, pp. 43–71.

Tien–Shun Gary Yang et al., "Joint Virtual Path Routing and Capacity Design for ATM Networks", Computer Communications, vol. 19, No. 13, Jan. 1, 1996, pp. 1029–1035.

New Routing Algorithms for Large Interconnectd Networks, IBM Technical Disclosure Bulletin, vol. 35, No. 1A, Jun. 1992, pp. 436–437.

Jean Bernard Stefani, "Open Distributed Processing: An Architectural Basis for Information Networks", Computer Communications, vol. 18, No. 11, Nov. 1995, pp 849–862.

\* cited by examiner

*Primary Examiner*—Kim Nguyen
(74) *Attorney, Agent, or Firm*—Knobbe Martens Olson & Bear LLP

(57) ABSTRACT

A network management method for performing communication between any nodes in a network wherein a plurality of nodes are connected, said network management method characterized in that: a connection request having at least a logical node name of the destination of connection is successively propagated to a node having a possibility of active connection with the node of the destination of connection based on information on nodes in the vicinity of that node stored in each node; a route for actively connecting desired nodes is searched for; and the nodes are made to actively connect and communication between the nodes is made to be performed.

4 Claims, 9 Drawing Sheets

FIG. 4A

Token :
(mediate instruction destination task result-handling token-ID
         origin-node origin-mediator token-sender co-successors)

Instruction :
search, connect, perform, collect

Destination :
((name "XXX VoD Server")
  (reference 'domain local node reference'
  (object-name "XXX server manager")
  (object-reference 'domain local object reference')
  (network-domain "network-provider")
  (problem-domain "multimedia network-service")
  (application-domain "video-on-demand")
  (communication-medium internet))

Task :
(object method arguments)

Result-Handling :
return-value, return-status, store,and/or propagate

FIG. 4B

Token :
(mediate
    search
    ((name "XXX Vod Server")
      (reference 'domain local node reference')
      (object-name "XXX server manager")
      (object -reference 'domain local object reference')
      (network-domain network-provider)
      (problem-damain" multimeia-network-service")
      (application-domain" video-on-demand")
      (communication-medium internet))
    (object-method arguments)
    (return-value return-status)
    token-ID
    node-reference
    node-reference
    node-reference
    (node-reference node-reference ... node-reference)
)

FIG. 8

Network Domains ((domainN-1 (domainN-1i distance) (domainN-1j distance) · · · (domainN-1k distance))
 (domainN-2 (domainN-2i distance) (domainN-2j distance) · · · (domainN-2k distance))
 · · ·
 (domainN-N (domainN-Ni distance) (domainN-Nj distance) · · · (domainN-Nk distance)))

Problem Domains ((domainP-1 (domainP-1i distance) (domainP-1j distance) · · · (domainP-1k distance))
 (domainP-2 (domainP-2i distance) (domainP-2j distance) · · · (domainP-2k distance))
 · · ·
 (domainP-N (domainP-Ni distance) (domainP-Nj distance) · · · (domainP-Nk distance)))

Application Domains ((domainA-1 (domainA-1i distance) (domainA-1j distance) · · · (domainA-1k distance))
 (domainA-2 (domainA-2i distance) (domainA-2j distance) · · · (domainA-2k distance))
 · · ·
 (domainA-N (domainA-Ni distance) (domainA-Nj distance) · · · (domainA-Nk distance)))

| NODE-CLASS | VoD server |
|---|---|
| NODE-NAME | XXX |
| REFERENCE | 'NODE REFERENCE' |
| COMMUNICATION-MEDIUM | internet |
| OWNER NAME/REFERENCE | 'NODE REFERENCE' |
| NETWORK-DOMAIN | network provider |
| PROBLEM-DOMAIN | multimedia network |
| APPLICATION-DOMAIN | video-on-demand |

NETWORK MANAGEMENT METHOD, APPARATUS OF SAME AND NETWORK SYSTEMS

CROSS REFERENCE TO RELATED APPLICATION

This application is a continuation of U.S. patent application Ser. No. 09/957,440 entitled "NETWORK MANAGEMENT METHOD, APPARATUS OF SAME, AND NETWORK SYSTEMS" and filed on Sep. 17, 2001, now U.S. Pat. No. 6,683,857, which is a continuation of U.S. patent application Ser. No. 08/811,472 entitled "NETWORK MANAGEMENT METHOD, APPARATUS OF SAME, AND NETWORK SYSTEMS" and filed on Mar. 4, 1997, now U.S. Pat. No. 6,335,919. The disclosures of the above-described filed applications are hereby incorporated by reference in their entirety.

BACKGROUND OF THE INVENTION

1. Field of the Invention

The present invention relates to a network management method for performing desired communication among data processing apparatuses in a network wherein a plurality of data processing apparatuses, for example, computers, are connected, an apparatus for the same, and a network system which can adequately perform such communication.

2. Description of the Related Art

Along with the development of data processing technology and communication technology, progress has been made in the construction of a network in which various data processing apparatuses are connected and information is used and various data processings are performed more effectively.

For example, progress has been made in the construction of an inter-network creating a large scale network by connecting a plurality of computer networks. Particularly, the so-called "Internet", which is a global scale network using TCP/IP as a protocol, may be typical example of such a network.

In the Internet, an IP address and domain name are given to each node on the network. An IP address is an identification number of each data processing apparatus connected to the network and represented by 32 bits of integer. Further, a domain name is a name which enables differentiation of a node on the network by a symbolic name having meaning to the user and is given to each range of management of a network divided into such ranges. These IP address and domain name must not be duplicated on the network, that is, throughout the world, and are centrally managed by a network information center (NIC).

When performing communication with a desired node in such a space, a point-to-point physical connection is made via a router or the like.

Further, in recent years, cable television (CATV) systems have been rapidly growing. Video-on-demand (VOD) and other services provided in such CATV systems are services which are provided in an environment where two-way communication is possible. Such an allotter network now has a strong color as an information network.

Further, networks of various formats and various sizes are rapidly spreading such as with the construction of digital exchange networks and ISDN, the spread of mobile communication networks, and the start of satellite communication services.

In the networks mentioned before, however, there was the problem that there were numerous restrictions on the configuration or processing systems based on physical conditions, so it was very difficult to effectively realize various processings via the network.

First, all of such networks have a central centralized management system, thus must set the spatial information of the network in advance. For this reason, flexibility with respect to the configuration of the network is poor and, in addition, if the size of the network becomes large, there arises a problem that the management costs of the network space thereof becomes large.

More specifically, in for example the Internet as mentioned before, the IP addresses and the domain names are managed by the NIC. Therefore, when it is intended to newly add a data processing apparatus, a local network, or the like to the network, application must be made to the NIT for granting of the same, thus a node cannot be immediately and arbitrarily added.

On the other hand, demand for mobile computing has rapidly increased in recent years. There are now strong demands that the nodes be able to be dynamically added to the network.

Further, there was a demand that, together with flexibility with respect to the configuration of each network, the processing with respect to that network be able to be easily carried out by for example the logic name set by the application or the logical network configuration. Further, there has been a demand that high grade network processing such as, for example, the placement of a program module on each node on the network and the network wide distributed processing, be performed, but the current network management method could not answer such a demand.

Further, as mentioned before, irrespective of the spread of networks of various formats, usually connection is only possible by one route of one format. Comprehensive network utilization could not be achieved. For example, even when the Internet and the cable TV network are connected, they are merely connected in series and cannot be effectively utilized.

SUMMARY OF THE INVENTION

An object of the present invention is to provide a network management method that increases the flexibility in configuration or processing system for networks of various formats and thereby makes the connection relationship among the networks closer so as to enable more effective data processing on the network, in other words, more effective service.

Another object of the present invention is to provide a network management apparatus for realizing such a network.

Another object of the present invention is meant to provide such a network system.

In order to solve the above-mentioned problems, the network is managed for each local partial network. Along with this, the communication among the nodes is performed by propagation of a space search by hypothetical connections.

Accordingly, the network management method of the present invention has a connection request having at least a logical node name of the destination of connection successively propagated to a node having a possibility of active connection with the node of the destination of connection based on information on nodes in the vicinity of that node stored in each node; has a route for actively connecting desired nodes is searched for; and has the nodes made to actively connect and communication between the nodes made to be performed.

Preferably, the information of nodes in a partial network and the information of another partial network connected to the partial network are managed for each of any partial networks of the network; and based on the information managed in each partial network, in each partial network, the connection request is propagated to another partial network having a possibility of active connection with the node of the destination of connection and a node having a possibility of active connection with the node of the destination of connection in the partial network so as to search for the route.

More preferably, a node is added or deleted by updating only the information managed by the partial network containing the node to be added or deleted.

Still more preferably, between networks having different formats, the node to which the networks having the different formats are connected manages the format and information of both of the different networks, converts the format of the connection request, and propagates the connection request.

Specifically, when a plurality of nodes are retrieved as destinations of connection by the search, a single optimum node is selected from among the retrieved plurality of nodes by a predetermined evaluation method and the selected node is actively connected to the node of the origin of request and made to perform the communication. Any evaluation method can be adopted as this evaluation method. For example, it is also possible to set data that indicates the attributes of the node in the connection request and compare the data with the attributes of the retrieved node to perform the evaluation and it is also possible to use the distance of the route as the evaluation value and select the node with the shortest route.

Specifically, when a plurality of routes are retrieved among the nodes by the search, any plurality of routes among the plurality of routes are made actively valid and the communication is performed in parallel via the plurality of routes. For example, where a route via a cable TV network and a route via a public telephone line are retrieved, it is also possible to transmit video data via the cable TV network and transmit audio data via the public telephone line. Further, it is also possible to perform the transmission of the AV data via the cable TV network and transmit the charge information with respect to the transmitted AV data via the public telephone line.

Further, conversely to the case mentioned before, when a plurality of routes are retrieved among the nodes by the search, it is also possible to select a single optimum route from among the retrieved plurality of routes by a predetermined evaluation method and actively connect the nodes by the selected route to perform the communication. This evaluation can be carried out by a similar method to the evaluation of the nodes. Further, particularly in the case of the selection of the route, preferably the route is selected according to the type of the transmission data. For example, where a cable TV network and public telephone line are retrieved, it is sufficient so far as the cable TV network is selected if the AV data is to be transmitted, while the public telephone line is selected if audio data and text data are selected.

Further, specifically, in the data management method of the present invention, the route between the retrieved desired nodes is secured as the communication route, that is, the connection of lines is maintained, and the communication is carried out between those nodes by this.

Further, specifically, any transmission data is given to the connection request and propagated and the data transfer between desired nodes is carried out by this. Namely, even if the lines are not always connected, it is sufficient so far as a state of connection is temporarily establish during only the period where the connection request of for example the packet format is transferred.

In such a case, particularly where this transmission data is the control data at the node of the destination of connection, the destination of connection can be made to perform the predetermined processing by transferring only the connection request by such a search. Namely, the predetermined processing with respect to any node can be controlled, and the control of the program modules among nodes and parallel processing by a plurality of nodes can be managed.

Further, where this transmission data is the data for requesting the acquisition of information, predetermined information can be requested from the destination of connection by just transferring the connection request by such a search and, further, the information as the result of this can be obtained via the route obtained at that search.

Further, preferably, in the network management method of the present invention, by managing the program module processed at each node connected to the network in the same way as the nodes, a connection request regarding a program module as the destination of connection requested by a node or a program module is successively propagated to a node having a possibility of active connection with the program module of the destination of connection based on the information on the nodes in the vicinity of the node and program module, which is stored in each node; the route which can be actively connected to the program module of the destination of connection is searched for; and the node or program module of the origin of request and the program module of the destination of connection are actively connected by the route and made to perform the communication.

Further, in the network management apparatus of the present invention is provided for every optional partial network of the network to which a plurality of nodes are connected; manages the information of the nodes in the partial network and the other partial network connected to this partial network; and outputs a connection request having at least the logical node name of the destination of connection which is input via the network to another partial network having a possibility of active connection with the node of the destination of connection and the node having a possibility of active connection with the node of the destination of connection in this partial network based on the management information.

Preferably, in the network management apparatus, at least the information of the nodes in the partial network is updated based on the information of addition or deletion of nodes in the partial network which was input.

Further, another network management apparatus of the present invention is provided among a plurality of networks having different formats; manages the format and information of two of the networks having different formats; converts in format a connection request having at least the logical node name of the destination of connection input from any network; outputs the same to another network to propagate the connection request among different networks; and thereby searches for the connection route between the desired nodes.

Preferably, the network management apparatus updates the information of the network based on the information of addition or deletion of the nodes of the plurality of networks which was input.

Further, in the network system of the present invention, a plurality of nodes, each of which manages information of the nodes in the vicinity thereof and outputs a connection request having at least the logical node name of the destination of connection input via the network to a node having a possibility of active connection with the node of the destination of connection based on the information managed in the node, are connected on the network; the route connecting the desired nodes is searched for by propagating the connection request; and the nodes are actively connected and the communication between the nodes is carried out. Note that the size of this network system is not relevant in any way. For example, the invention can be applied as also a distributed processing system used in a closed environment such as a business and can be applied as a global wide area network.

Preferably, the network system further has a partial network managing means for managing the information of nodes in the partial network and the information of another partial network connected to the partial network for each of any partial networks of the network and outputting a connection request to another partial network having a possibility of active connection with the node of the destination of connection and the node having a possibility of active connection with the node of the destination of connection in the partial network based on the managed information.

Preferably, in the network system, at the time of addition or deletion of a node, only the information of the node stored in the partial network managing means of the partial network containing the node to be added or deleted is updated and a state enabling communication is maintained between any nodes.

Preferably, in the network system, the network is constituted by a plurality of networks having different formats and provision is further made of a router means which is provided among the plurality of networks having different formats, manages the format and information of two of the networks having different formats, converts the format of the connection request input from any network, and outputs the same to another network.

Preferably, when a plurality of nodes are retrieved as the destination of connection by the search, a single optimum node is selected from among the retrieved plurality of nodes by a predetermined evaluation method and the selected node is actively connected to the node of the origin of request to perform the communication.

Specifically, when a plurality of routes are retrieved among the nodes by the search, the nodes are actively connected by any plurality of routes among the plurality of routes to perform the communication.

Also, specifically, when a plurality of routes are retrieved among the nodes by the search, a single optimum route is selected from among the retrieved plurality of routes by a predetermined evaluation method and the nodes are actively connected by the selected route to perform the communication.

Further, specifically, in the network system of the present invention, the route through which the connection request between the desired nodes is propagated is secured as a communication route to perform communication between the desired nodes.

Preferably, the connection request further has any control data and a predetermined processing based on the control data is carried out at the node of the destination of connection by establishing the active connection.

Also, preferably, the connection request further has data for requesting the acquisition of any information and the information based on the data for requesting the acquisition is transferred from the node of the destination of connection to the node of the origin of request via the route through which the connection request is propagated by establishing the active connection.

Further, in the network system of the present invention, each of the nodes manages the information of the program modules processed at the nodes in the vicinity thereof or the node and outputs a connection request regarding the input program module as the destination of connection to a node having a possibility of active connection with the program module as the destination of connection based on the information of the nodes and program modules in the vicinity thereof; the connection request is propagated; the route which enables active connection to the program module of the destination of connection is searched for; and the node or the program module of the origin of request and the program module of the destination of connection are actively connected by the route to perform the communication.

BRIEF DESCRIPTION OF THE DRAWINGS

These and other objects and features of the present invention will become more apparent by the following description of the preferred embodiments made with reference to the attached drawings, wherein:

FIG. 4A is a view explaining a token, especially terms and main contents of the token;

FIG. 4B is a view indicating an example of the token actually been packaged;

FIG. 8 is a view of contents of the potential geometry;

DESCRIPTION OF THE PREFERRED EMBODIMENTS

An explanation will be made next of the network system of one embodiment of the present invention by referring to FIG. 1 to FIG. 3.

The network system shown in the present embodiment is a network system which serves as the basis for the utilization and circulation of various multimedia information and is managed by the network management method according to the present invention by using the network management apparatus according to the present invention.

Figure 1:
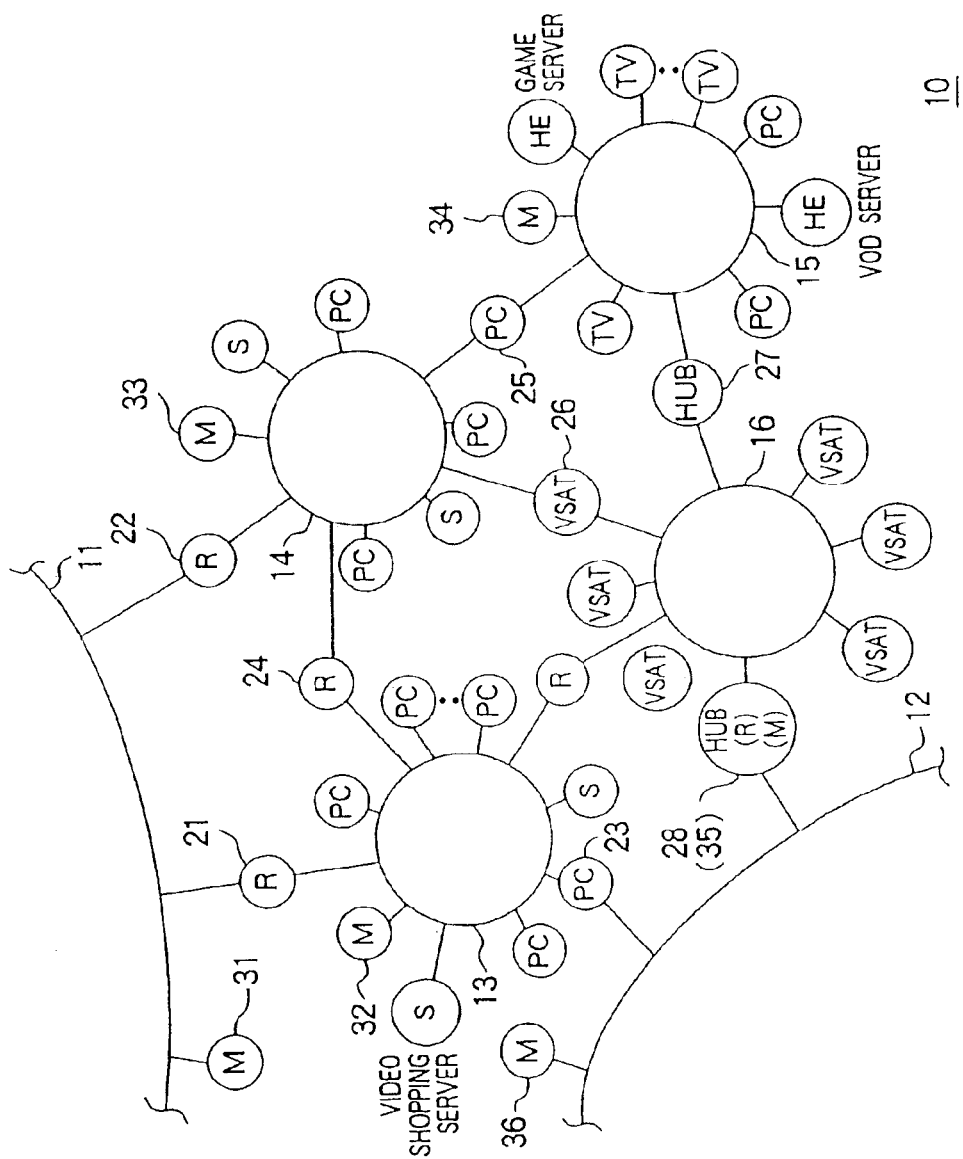
FIG. 1 is a view explaining a network system according to the present invention.

A network 10 thereof is shown in FIG. 1.

Physical Configuration of Network

The network 10 has six physical sub-networks 11 to 16.

The sub-networks 11 and 12 are basic networks that cover a broader area compared with the other sub-networks 13 to 16 and that have a large number of sub-networks connected to them and that are constructed by for example private high speed digital lines.

The sub-networks are usual local area networks (LAN) to which a large number of personal computers (PC) and server devices (S) are connected and are mainly constituted by Ethernets and communication lines.

The sub-network 15 is a cable television network connected by an optical fiber cable or coaxial cable and to which TV receivers (TV) connected via head end devices (HE) in the broadcasting station and a set-top box or a personal computer (PC) connected via a cable or modem are connected.

The sub-network 16 is a wireless transmission network, in the present embodiment, a satellite communication system which comprises a master station (HUB) having a host computer and centrally monitoring and controlling the network and a slave station (VSAT) using a small size antenna and having a personal computer, various communication apparatuses, monitors, etc. This performs two-way communication via a communication satellite.

The sub-networks 11 to 16 are connected as illustrated via routers (R) 21 to 28. The routers 21 to 28 exist as nodes with respect to both connected networks and have management information of both sub-networks to be routed, convert a signal input via one network to a format which can be output to the other network, and output the same. Using these routers, data can be transferred among the computer networks 11 to 14, the cable TV network 15, the satellite communication network 16, etc.

Network Space Management

In this network 10, the network is managed by a management means provided for each of any local areas in a distributed manner. In the present embodiment, it is performed for every sub-network in the mediators (M) 31 to 36 individually provided for the sub-networks 11 to 16.

The mediators 31 to 36 store the information of the nodes in the sub-networks and the information of the adjoining sub-networks and manage the input and output of the data to and from the nodes and the destination of output of the data to be transmitted by this.

The management information stored in the mediators 31 to 36 are updated one after another based on the addition or deletion of nodes. In the present embodiment, the following processing is carried out for this purpose. First, the mediators 31 to 36 monitor the nodes connected to the sub-network to be managed at predetermined time intervals and immediately update the management information in the mediator when a node is deleted. Further, when a new data processing apparatus is connected to the sub-network or mobile terminal equipment is connected and a node is added, that data processing apparatus immediately transmits the connection information of a predetermined format to the mediator. The mediator performs the processing for giving an ID to the connected node or the like based on that information and updates the management information.

These processings are automatically performed according to a predetermined protocol, therefore it is sufficient so far as the user connects the data processing apparatus or mobile terminal to the network. No set up with respect to the network is required.

Network Connection

In a network system of the present embodiment managed by such a scheme, the nodes are connected by hypothetical connections for hypothetically constructing a path among the nodes.

More specifically, at first, the node of the origin of connection designates the node of the destination of connection by a function key word indicating the node name of the destination of connection or the nature of the node and outputs a connection request having the designation information to the mediator of the sub-network to which that node belongs.

In the mediator, based on the data of the connection request, a route having the possibility of existence of the destination of connection is detected and the connection request thereof is output to that route. The connection request is output to all routes having the possibility of connection. Further, for another sub-network, this connection request is output to the mediator of the sub-network.

Figure 2:
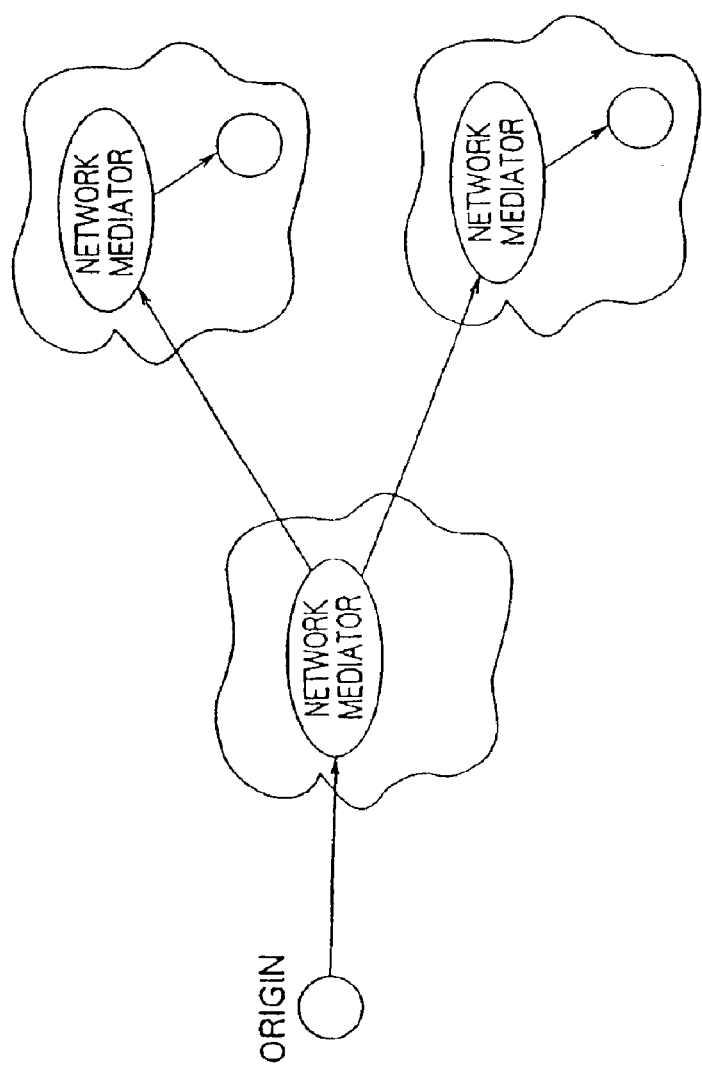
FIG. 2 is a view for explaining a hypothetical network connection.

By successively performing such an operation for the nodes, the connection request is successively propagated as shown in FIG. 2.

At this time, where the node is at the end of the network and that node itself is not the destination of connection thereof or where it is the mediator managing the sub-network and there is no route having the possibility of existence of the destination of connection after it, the search with respect to that route is terminated.

By successively performing such a heuristic search, finally the desired nodes are connected to each other.

After the route between the desired nodes is found, that is, after they are actively connected, any processing may be carried out by using that route or by the connection request data thereof.

For example, it is also possible to secure the route in a fixed manner and maintain the line to continuously perform the communication. Further, it is also possible to successively transmit data of a packet format and transfer data according to the route.

Further, where the object of the node connection is a request for some processing other than data transfer, preferably the control signal of that processing is added together with the connection request thereof. When doing this, from the point of time when the connection route is secured, that is, the connection request is transmitted to the destination of connection, the desired processing can be immediately carried out in the node of the destination of connection based on the control signal.

Further, by immediately transmitting the processing result, it is also possible to quickly receive the processing result. For example, an indication with respect to the video shopping server such as a request of the shopping environment, a change of the environment, a request for some information, charging, a change or closure of shops is executed so far as the control code thereof is attached to the connection request, so the result of the execution can be immediately obtained. Further, this is true also for an AV data transmission request with respect to a video server, transmission control such as fast forward, rewind, or pause, or a request for delivery of a game with respect to a game server, etc.

However, this search is performed based on the logical node name, in other words, based on the information which is at least merely locally managed, therefore there is a possibility that a plurality of nodes will be retrieved in the network as a whole as a result.

In such a case, in the present embodiment, information for specifying the node is further transmitted and the destination of connection is specified uniquely and then the communication processing is commenced. Note that this method of specifying a node may be any other method. In general, preferably some method for evaluation of a node is set and the node is selected by this evaluation method. More specifically, for example, it is also possible to set data that indicates the attributes of the node in the connection request and compare the data with the attributes of the retrieved node to perform the evaluation or it is also possible to use the distance of the route as the evaluation value and select the node having the shortest route.

Note that, there is a case where the node may be connected to any destination of connection without specifying any node when a plurality of destinations of connection are retrieved. In such a case, any node may be appropriately selected by the method of selecting for example the node having the shorter route.

Further, there also exists a case where the processing is instructed in parallel by connecting this to a plurality of destinations of connection or the communication should be carried out simultaneously. In such a case, it is also possible to make the route with all retrieved nodes valid to perform the subsequent processing.

Further, there also exists a case where a plurality of routes are retrieved for the same node of the destination of connection as a result of the search. In this case as well, it is possible to select any route in accordance with the object of the connection, the transfer data, etc. For example, when the obtained routes are routes having the same format, for example, when all are routes via the public lines, any one may be selected.

Further, where the obtained routes are routes of different formats, for example, a public line or ISDN line, the cable TV networks and the networks via the public telephone lines, etc., a preferred transmission route is selected in accordance with the type of the data to be transferred.

Further, it is also possible to use obtained plurality of routes in accordance with the connection object. For example, where the request of the VOD service is carried out, it is also possible to transmit he processing command such as the request of AV data, fast forward or rewind via the public telephone line, and receive the delivery of the AV data by utilizing the cable TV network or network via the communication satellite.

In this way, in the network 10 according to the present invention as shown in FIG. 1, the network is managed for every sub-network.

Accordingly, also changes in the node configuration such as the addition or deletion of a node may be independently carried out for every sub-network, therefore the flexibility with respect to a change of the network configuration becomes high.

Particularly, in an information service application such as a VOD, changes such as addition or deletion of a node to and from the space for the installation of a user node or the setting of a server node become easy to perform and so a higher quality service can be provided.

Further, it is possible to prevent an increase of the costs of management of the network.

Further, the processing for connection is carried out by not only the spatial information determined in advance, but also by dynamically obtaining the spatial information at the time of the connection, therefore the spatial management is flexible. Namely, not only can connection be made to a destination of connection which has been known in advance, but also communication becomes possible with respect to a destination of connection existing at the time of the connection. Further, the search can be carried out and the connection can be performed by the attributes of the node.

Further, since it is possible to dynamically add or delete a node to and from the space in this way, mobile computers, which may increase in the future, can be effectively dealt with.

Further, the search for a node at the time of connection can also be carried out by crossing the sub-nets or different networks on such a flexible space.

Since it then becomes possible to connect the desired nodes by a plurality of routes, it becomes possible to perform the data transmission by selecting networks of a plurality of different formats, for example, for every type of the transmission data and for the network to be more effectively utilized by linking up the routes. For example, in a VOD service etc., a multiplex network is realized where the video data is sent by satellite communication and cable according to the type of the data to be communicated and the control data is sent by the Internet and telephone line.

Space Management by Logical Network

In the embodiment mentioned before, to facilitate the explanation of the connection and search, the space management of the network was described as being performed for the local area for every sub-network. However, this management unit does not depend on the physical configuration of the network and can be managed by using any logical configuration as a unit.

An explanation will be made of such a network configuration by referring to FIG. 3.

Figure 3:
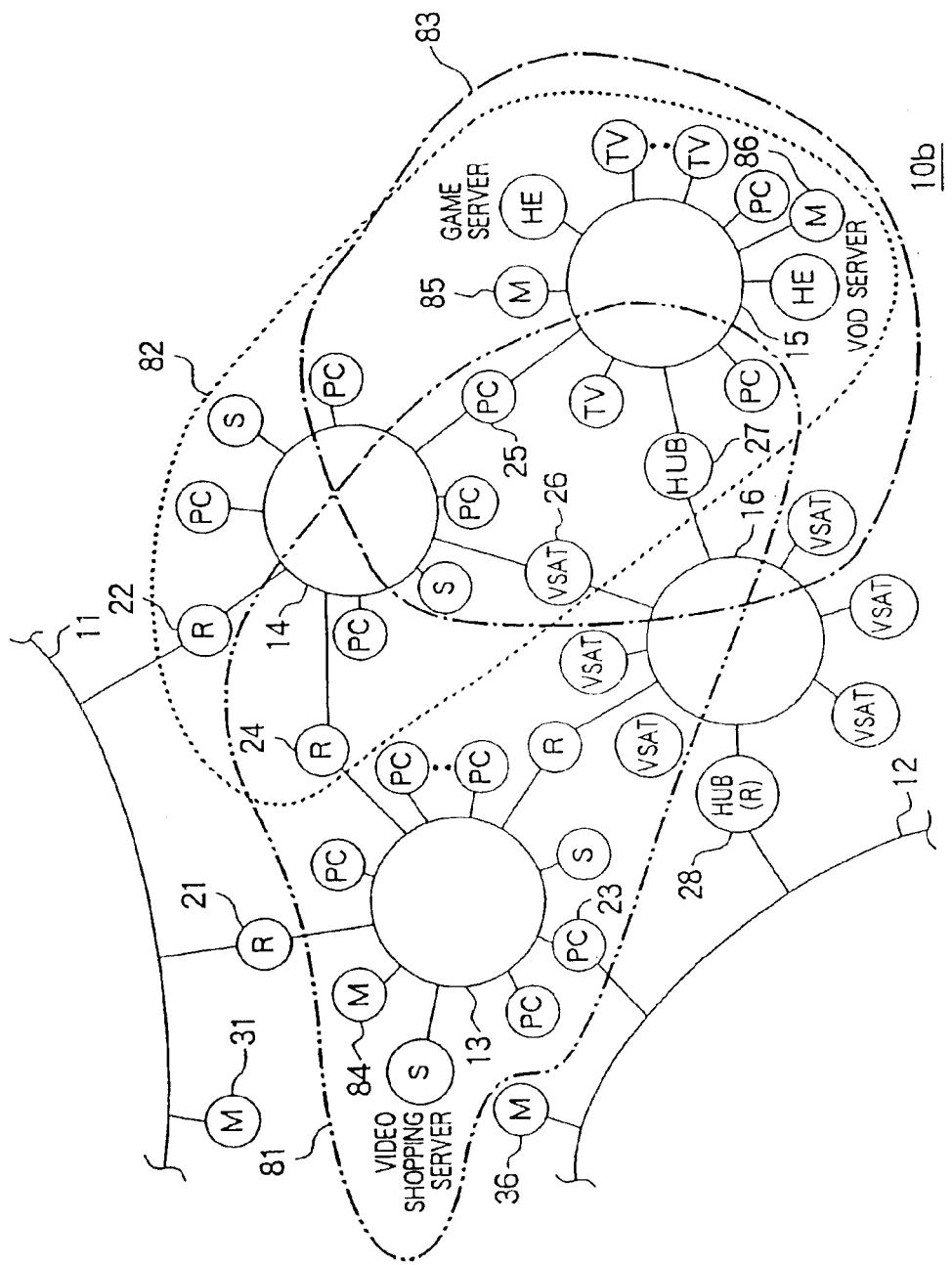
FIG. 3 is a view of the state where the network is managed by a logical sub-network.

FIG. 3 is a view of a state where a logical sub-network in accordance with the domain structure of the service to be provided is constituted on the physical network configuration. In FIG. 3, in a network 10b, three logical sub-networks 81 to 83 for every provided service exist.

The video shopping service network 81 is constituted by the sub-network 13 and the nodes of part of the sub-networks 14, 15, and 16. The video shopping environment is provided from the video shopping providing service 32 on the sub-network 13 to the nodes. In this environment, instructions such as shop tours, requests for product information, purchase, or payment are transmitted from the nodes to the server 32.

The video on demand (VOD) service 82 is a network constituted by the sub-network 15 and part of the sub-networks 14 and 16. The video data is delivered to the nodes from the VOD server 52 constituted by the head end device on the sub-net 15 in accordance with requests from the nodes.

The game service network 83 is constituted by the sub-networks 14 and 15. The game environment is delivered to the nodes from the game server 53 constituted on the sub-net 15 in accordance with the request from the nodes.

Then, mediators 84 to 86 are provided for every of these service networks. These mediators 84 to 86 manage the information of the nodes by the logical node configuration in the logical network and the logical node name and manage the information of the adjoining logical sub-networks, that is, logical sub-networks in the vicinity thereof which can be directly connected in the logical sub-network configuration. Accordingly, the transmission of the data between any nodes is managed by exactly the same space searching method as that mentioned before by using these logical node names and logical sub-networks.

Note that, at this time, in the mediators 84 to 86, the configuration of the logical nodes and sub-networks and the correspondence of them onto the physical network are separately managed by separate reference tables etc.

Further, where such a logical sub-network is constituted, there also occurs a case where one physical node is managed on a plurality of logical sub-networks, but such a state is allowable and has no problem.

Further, the node in the same logical sub-network sometimes exists on a different physical network, but the correspondence with the physical network is managed by the mediator so there is no problem in this either.

In this way, if the network is managed by using the logical sub-network configuration and the logical nodes, the network management matched with the configuration of the domain of the service can be carried out without being caught by the conventional physical configuration.

Then, the space management, search, and the management of connection can be carried out by not only the physical node name, but also the logical node name and logical network space.

Management of Program Module

Further, in the network system of the present invention, the program modules on the network can be managed and a network-wide distributed processing system etc. can be established.

Therefore, when for example a mediator monitors a node mentioned before etc., the addresses of the program modules opened on the node are retrieved, and the modules are managed.

This program module is dynamically managed by the management of the reference table between the nodes. At this time, preferably the reference to the physical node and the program module is expressed by a plurality of reference routes so that the communication route can be selectively used in accordance with the type of communication (specific type such as control, data transfer or charging processing) and type of the data (specific type such as the control data, video data or charging information).

Then, the search of the node or the program module is carried out by considering the program module existing on the node as a type of nature of the node. More specifically, the search of the module is carried out based on the module name, module class name, or the module designation by the function key word.

By making such a search possible, a search for the module becomes possible via the search of the nodes. Also, the opening of a program module on a certain node on another node becomes possible. Namely, it is possible to appropriately open a program module on any node on the network and perform the dynamic distribution processing by the network wide.

In this way, in the highest level of the present invention, the network can be managed by three layers of the node configuration of physical local area, logical node configuration level, and the program module configuration.

The space management for connection can be performed by also the node name set up by the program module.

Concrete Configuration of the Communication Data

The network system of the present invention was explained before, then the explanation of the concrete method to construct such network system will be made.

First, as mentioned above, packet-type data are transmitted successively in this network system. An explanation will be made next of the packet-type data by referring to FIG. 4.

In this network system, packets, called token and of which typical format are shown in FIG. 4, are included in messages so that communication between any nodes are carried out.

FIG. 4A and FIG. 4B are views explaining the token. In FIG. 4A, terms included the token and contents of the terms of which contents are not node reference information are shown. Further, FIG. 4B is a view of an example of the token actually been packaged.

As shown in FIG. 4A and FIG. 4B, the token usually includes information of instruction, destination, task, result-handling, token-ID, origin-node, origin-mediator, destination node, destination mediator, token-sender, and co-successors.

Note that, in this embodiment, a post-mediator to which a token are propagated from the current mediator is called successor, and a pre-mediator from which a token are propagated to the current mediator is called predecessor.

Each instruction of 'search', 'connect', 'perform' and 'collect' is set in the token as instruction information.

'Search' is an instruction to search the object indicated in the destination information of the token.

'Connect' is an instruction to connect to the object indicated in the destination information o the token and to secure the connected communication line.

'Collect' is an instruction to collect objects which are adapted for the condition indicated in the destination information of the token.

'Perform' is an instruction to carry out the determined task at the object indicated in the destination information of the token.

Destination information are many kinds of information to specify the object that the token is looking for, the token are going to connect to, and the token be to carry out any processing, and are information such as name, reference, object-name, object-reference, network-domain, problem-domain, application-domain, and communication-medium. Any terms of these information, which information is seen clearly, are described in a token selectively.

Task information is information which defines the task done at the node indicated in the destination of the token when the instruction is 'perform' and includes information of 'object', 'method', and 'arguments'.

The result-handling information is an information to select the processings such as return-value, return-status, store-result (value and/or state), propagate-result (to mediators) based on the result of the processing. A plurality terms of these can be selected. For example, 'store' and 'propagate' are selected, processing to store the result not only in the origin mediator but also in the mediators on the way from the origin mediator to, the destination mediator can be designated.

Token-Id information is identification code of the token added at the origin node.

Origin-node and Origin-mediator information are information which indicate the node and the mediator in which the token generated.

Destination-node and destination mediator information are information which indicate the node and the mediator the token arrived at as a result based on the destination information.

Token-sender information is an information of the sender of the token in every node-to-node transmission.

Co-successor information is an information indicate successors of mediators searched from certain mediator at a same time and an information for informing each successors of other successors.

Concrete Configuration of Mediator

An explanation will be made next of a mediator which transmits tokens successively and manages the network of the present invention by referring to FIG. 5 to FIG. 9.

Figure 5:
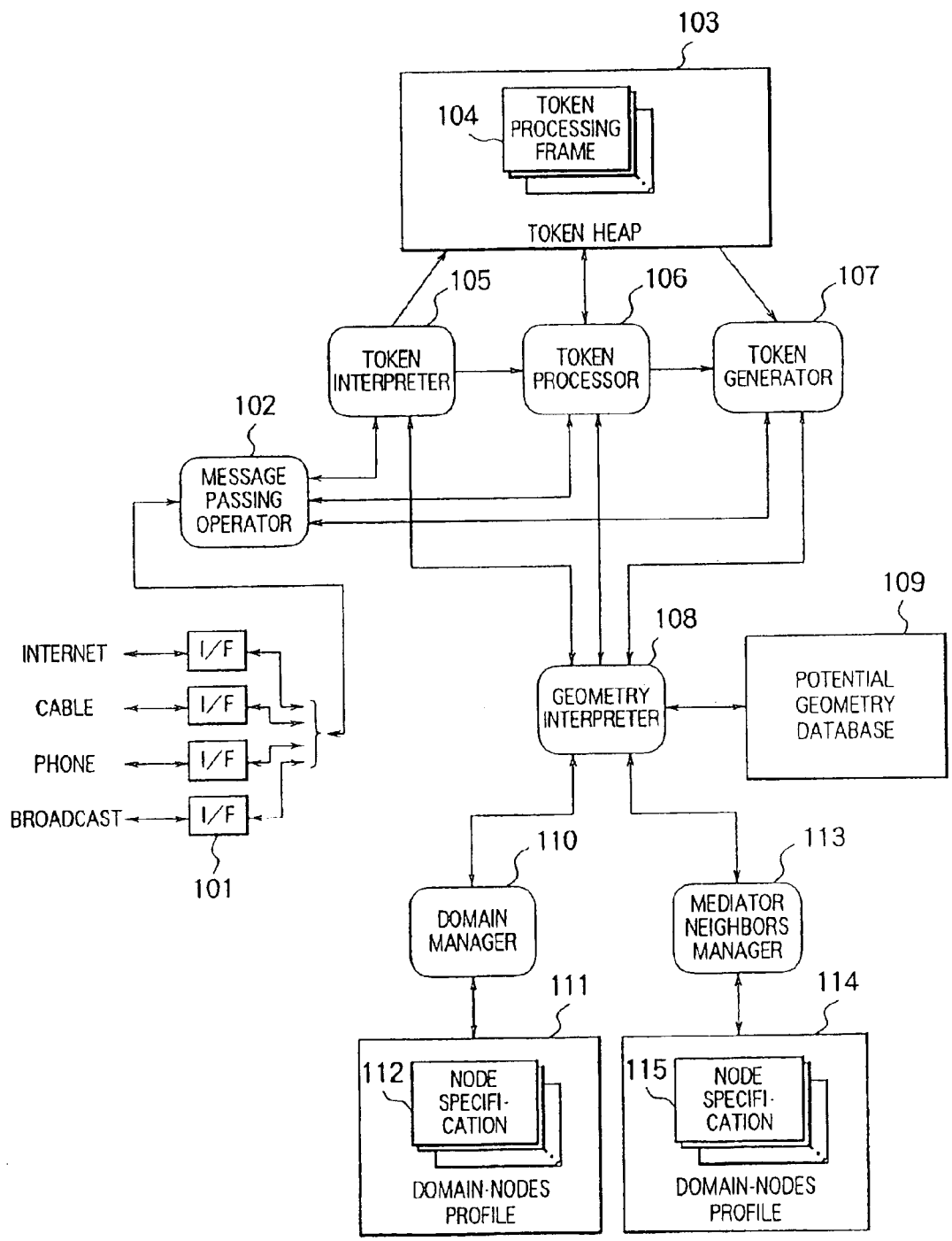
FIG. 5 is a view of the configuration of the mediator.

FIG. 5 is a view of the configuration of a mediator concretely.

The mediator comprises network interfaces 101, message passing operator 102, token heap 103, token interpreter 105, token processor 106, token generator 107, geometry interpreter 108, potential geometry 109, domain manager 110, domain nodes profile 111, mediator neighbors manager 113, and mediator neighbors profile 114.

Network I/Fs 101 are interfaces between the mediator and networks. I/F units which transmits messages between internet and a mediator, cable network and a mediator, phone network and a mediator, and broadcast network and a mediator are prepared.

The message passing operator 102 actually carries out the communication with other mediator via network I/F 101, receives requests from general nodes, and transmits the result. As a communication between mediators, message communication is done and in this message said token is included.

Figure 6:
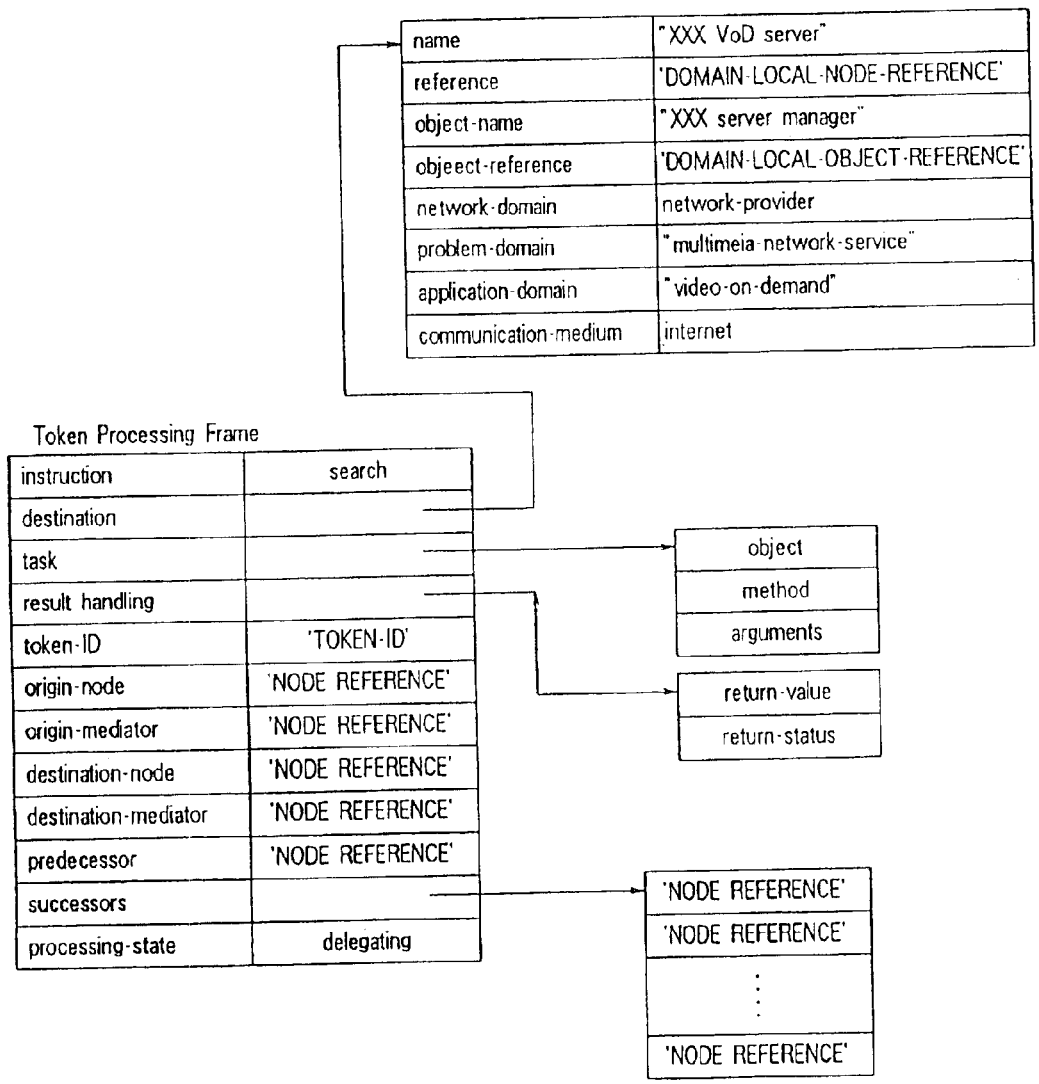
FIG. 6 is a view of the configuration of a token processing frame.

Token Interpreter 105 generates token processing frame 104 on the token heap 103 based on the token received at message passing operator 102. the token processing frame 104 is shown in FIG. 6.

Main terms of the contents of the token processing frame 104 shown in FIG. 6 are same as those of token.

Note that, in the figure, 'node reference' means reference information on the network.

Note that, in token interpreter 105, when an inputted token is same as the token already generated or is not needed, a token processing frame isn't generated.

Token processor 106 manages the state of the token, recognizes the token, and carries out and manages the task of the token.

An explanation will be made next of the processing state transition of the processing token by referring to FIG. 7.

Figure 7:
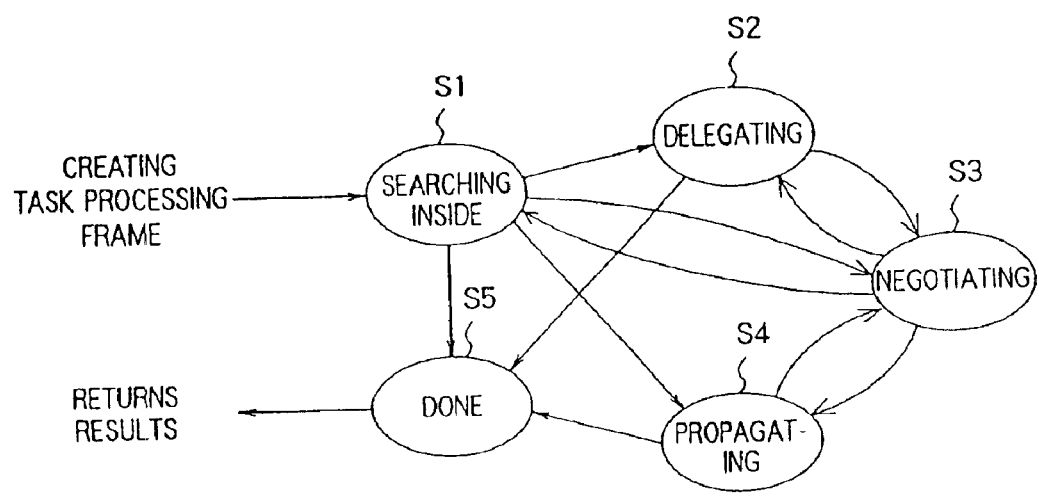
FIG. 7 is a diagram indicating the processing state transition when task processing are done.

FIG. 7 is a diagram of processing-state transition of processing state.

In token processor 106, first searchings inside of the sub-network managed by the current mediator are carried out after task processing frame is generated based on token processing frame 104.(searching inside state: S1) After this, desired task is carried out with transmitting of the processing state based on the solving state and the connecting state. When problems are solved and connection is secured, the result is returned from done state and the task is finished.

Token generator 107 generates a token based on contents of token processing frame 104.

The geometry interpreter 108 recognizes and decides on the relationship of the relative positions of a mediator or a node based on data stored in potential geometry 109. Concretely, Geometry interpreter 108 carries out the processing to decide next sender mediator (successor) about certain token. The decision processing is done by noticing the domain designated as a destination domain and looking the mediators which are near to the current mediator and far from the origin domain and predecessor as successor. Note that, the distance D is calculated by the equation (1).

$$D = ((\text{distance between network domains})^2 + (\text{distance between program domains})^2 + (\text{distance between application domains})^2)^{1/2}$$

Potential geometry 109 stores geometries of the domain and is intellectual database in which data indicating distance of each domains are stored.

The contents of the potential geometry are shown in FIG. 8.

As shown in FIG. 8, in the potential geometry 108, distances of each domains are stored packed by the three kind of the domain, network domain, problem domain, and application domain.

Next successor of the token are selected from the mediator-neighbors based on this intellectual.

Domain manager 110 manages its own territory and the relationship of the domain manager 110 and its own territory is equivalent to, for example, that of sub-network 11 and mediator 31 and sub-network 13 and mediator 32 in the configuration shown in FIG. 1.

Domain nodes profile 111 is the accumulation of node specification information 112 and referenced by Domain manager 110.

Mediator Neighbors manager 113 manages references of mediator neighbors.

Mediator neighbors profile 114 is the accumulation of node specification information 115 and referenced by mediator neighbors manager 113.

Figures 9, 10:
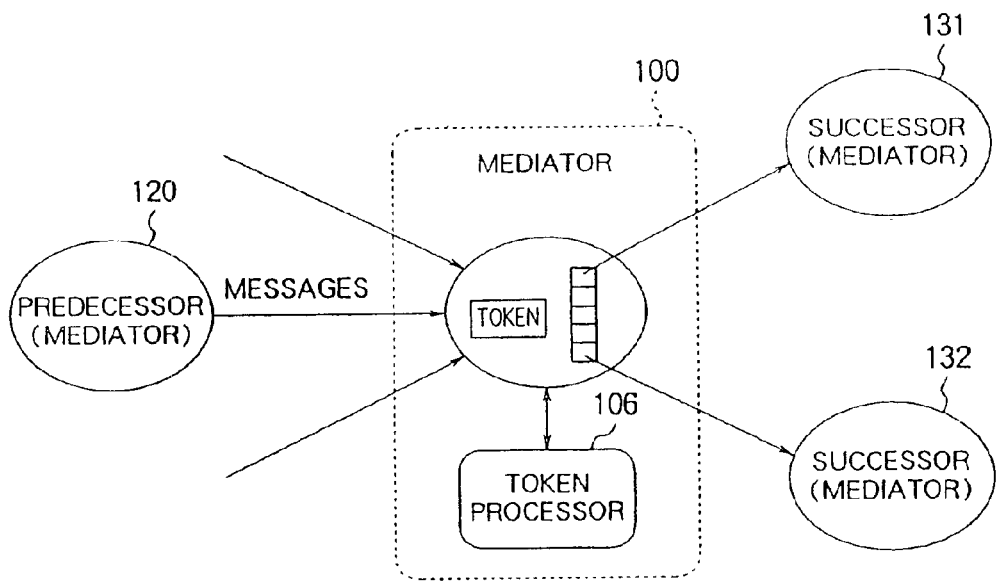
FIG. 9 is a view indicating node specification information stored in domain nodes profile and neighbors node specification information stored in mediator neighbors profile.
FIG. 10 is a view of token processing propagation scheme.

FIG. 9 is a view explaining the contents of node specification 112 stored in domain nodes profile 111 and node specification 115 stored in mediator neighbors profile 113.

An explanation will be made next of the propagation state of the token mentioned above in the mediator having such configuration, by referring to FIG. 10.

FIG. 10 is a diagram explaining toke processing propagation scheme.

In FIG. 10, many tokens are sent successively from the predecessor 120 to the mediator 100 by message communication. In the mediator 100, the tokens are recognized and token processing frame 104 are generated on the token heap 103. The token overlapped with another one is removed in token interpreter 105. And then, the token stored token processing frame are successively processed by token processor 106.

Then about the object of which processing is finished suitably and a successor is decided, a token is generated by token generator 107 and is sent to next mediator(successor)

by using such a token and a mediator having configurations mentioned above, the network system of the present invention explained before by referring to FIG. 1 to FIG. 3 can be realized.

According to the present invention, a network management method and an apparatus for the same which are flexible in configuration or processing system for networks of various formats and make the connection relationship among the networks closer so as to provide more effective data processing, in other words, more effective service on the network.

Further, such an effective network system could be provided.

What is claimed is:

1. A network management apparatus, which is provided for each of any partial networks arbitrarily determined by combining any nodes of a network, comprising:
   a message passing operator operable to receive a token for connection request, which is output via a node in a partial network the network management apparatus manages, having destination information specifying contents of communication including a desired function, information of an object, or information of a problem domain relating to the function;
   a token processor operable to detect a route having the possibility of existence of the destination for connection on the basis of the destination information of the received token; and
   a token generator operable to output the other destination information which is useful for selecting one route having the possibility of connection among the detected routes to the token processor when a plurality of routes are detected, co-operate with the token processor to select the one route by constructing hypothetically a path for connection and output a token for connection request to the selected one route.

2. The network management apparatus according to claim 1, wherein the token processor carries out a search for the destination for connection inside the partial network managed by the network management apparatus and the token generator outputs the token for connection request to another partial network after searching inside the managed partial network.

3. The network management apparatus according to claim 2, further comprising a mediator neighbors manager operable to manage information of nodes in the adjoining partial network which can be connected to the managed partial network, wherein the route having the possibility of existence of the destination for connection is detected on the basis of the managed information.

4. The network management apparatus according to claim 3, wherein at least the managed information of the nodes in the adjoining partial network is updated based on input information on the addition or delete of nodes in the adjoining partial network.

* * * * *

UNITED STATES PATENT AND TRADEMARK OFFICE
CERTIFICATE OF CORRECTION

PATENT NO. : 6,891,806 B2
DATED : May 10, 2005
INVENTOR(S) : Hirotoshi Maegawa

It is certified that error appears in the above-identified patent and that said Letters Patent is hereby corrected as shown below:

Column 2,
Line 17, please delete "Interconnectd" and insert therefore, -- Interconnected --.

Column 16,
Line 6, please delete "delete" and insert therefore, -- deletion --.

Signed and Sealed this

Twenty-seventh Day of September, 2005

JON W. DUDAS
*Director of the United States Patent and Trademark Office*